United States Patent [19]

Kiser

[11] Patent Number: 5,765,856
[45] Date of Patent: Jun. 16, 1998

[54] COLLAPSIBLE THREE WHEELED STROLLER WITH CANOPY

[76] Inventor: Randolph L. Kiser, 789 Johnston Dr., Sidney, Ohio 45365

[21] Appl. No.: 736,744

[22] Filed: Oct. 25, 1996

[51] Int. Cl.[6] ........................................................ A47C 7/62
[52] U.S. Cl. .......................... 280/642; 280/658; 280/47.38; 296/97.13; 297/184.13
[58] Field of Search .................................. 280/642, 650, 280/658, 644, 647, 40, 47.36, 652, 47.38; 297/184.13, 184.11, 184.17, 184.1, 184.5; 296/97.9, 97.12, 97.13, 97.22

[56] References Cited

U.S. PATENT DOCUMENTS

| 5,257,799 | 11/1993 | Cone et al. | 280/642 |
| 5,388,853 | 2/1995 | Lauro | 280/642 |
| 5,454,584 | 10/1995 | Haut et al. | 280/642 |
| 5,556,155 | 9/1996 | Welter | 296/97.12 |
| 5,624,152 | 4/1997 | Yoshie et al. | 280/642 |

Primary Examiner—Richard M. Camby

[57] ABSTRACT

The present invention relates to a three wheeled stroller which is adapted for use in transporting an infant. The stroller includes a collapsible frame structure and a seat which is adapted to be secured thereto. This frame structure is both laterally collapsible and foldable to facilitate the storage and transportation of the stroller. Both the collapsing and the folding can be initiated by way of an upper lock assembly positioned adjacent the handles of the frame. The stroller also includes a canopy for use in selectively shielding the infant.

5 Claims, 4 Drawing Sheets

COLLAPSIBLE THREE WHEELED STROLLER WITH CANOPY

BACKGROUND OF THE INVENTION

1. Field of the Invention

The present invention relates to a three wheeled stroller and, more particularly, to such a stroller which includes an improved canopy assembly.

2. Description of the Prior Art

The use of three wheeled strollers is known in the prior art. Furthermore, the use of foldable three wheeled strollers is also known in the prior art. These folding arrangements contemplate folding one or more frame components relative to one another. All such folding arrangements enable the stroller to be more readily stored and transported. Furthermore, there are various stroller arrangements in the prior art which contemplate the use of canopies.

None of the prior art collapsible three wheeled strollers utilize a canopy with two discrete locking positions.

The literature discloses various stroller arrangements. Note U.S. Pat. No. 5,468,009 to Eyman et al.; U.S. Pat. No. 5,356,171 to Schmidlin et al.; and U.S. Pat. No. 5,364,119 to Leu each of which disclose folding three wheeled strollers or stroller frames. Additionally, U.S. Pat. No. 5,076,599 to Lockett et al.; U.S. Pat. No. 5,029,891 to Jacobs; U.S. Pat. No. 4,953,880 to Sudakoff et al.; U.S. Pat. No. 4,934,728 to Chen and U.S. Design Patent 364,131 Eichhorn et al. all disclose various three wheeled stroller arrangements.

However, none of these strollers is laterally collapsible. Furthermore, none of the prior art strollers disclose a canopy which utilizes a resilient support rod which is lockable at two distinct positions.

The present invention achieves its intended purposes, objects and advantages over the prior art through a new, useful and unobvious combination of components elements, through the use of a minimum number of functioning parts, at a reasonable cost to manufacture, and through the utilization of only readily available and conventional materials.

Thus, the present invention relates to a new and improved canopy assembly for a stroller with simplified mechanisms to facilitate assembly and use comprising: a stroller having a frame assembly with a lower component, an upper component and an intermediate component therebetween; a plurality of wheels rotatable about horizontal axes coupled with respect to the lower component; a pair of handles secured with respect to the frame adjacent to the upper component thereof and a seat coupled with respect to the frame adjacent the intermediate extent thereof; fixed support locks secured to the frame adjacent to the intermediate component, each lock having an enlarged recess adjacent to the upper extents thereof with a circular aperture extending therethrough and a forward support rod of an extended length with enlarged remote ends and an intermediate extent therebetween, the enlarged remote ends having diametric apertures extending therethrough, each diametric aperture positionable in axial alignment with an associated circular aperture in the support lock with a cylindrical pin extending through each circular aperture and diametric aperture to allow the pivoting of the rod between a forward operative position over the seat and a rearward inoperative position rearward of the seat.

Therefore, it is an object of this invention to provide a three wheeled stroller which overcomes the inadequacies of the prior art devices and which constitutes an improvement which is a significant contribution to the advancement of the art.

Another object of the invention to enable the user of a three wheeled stroller to selectively provide shade to the infant riding therein.

It is a further object of the present invention to provide a locking means to lock a canopy in either a forward operative position or a rearward inoperative position.

It is another object of the present invention to provide a three wheeled stroller which may be easily and efficiently manufactured and marketed.

It is further object of the present invention to provide a three wheeled stroller construction which is of a durable and reliable construction.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention as defined by the claims taken in conjunction with the accompanying drawings.

SUMMARY OF THE INVENTION

The invention is defined by the appended claims with the specific embodiment shown on the attached drawings. For the purposes of summarizing the invention, the invention essentially comprises a collapsible three wheeled stroller for use in transporting an infant.

Therefore, the present invention relates to a new and improved canopy assembly for a stroller with simplified mechanisms to facilitate assembly and use comprising: a stroller having a frame assembly with a lower component, an upper component and an intermediate component therebetween; a plurality of wheels rotatable about horizontal axes coupled with respect to the lower component; a pair of handles secured with respect to the frame adjacent to the upper component thereof and a seat coupled with respect to the frame adjacent the intermediate extent thereof; fixed support locks secured to the frame adjacent to the intermediate component, each lock having an enlarged recess adjacent to the upper extents thereof with a circular aperture extending therethrough; a forward support rod fabricated of a resilient material of an extended length with enlarged remote ends and an intermediate extent therebetween, the enlarged remote ends having diametric apertures extending therethrough, each diametric aperture positionable in axial alignment with an associated circular aperture in the support lock with a cylindrical pin extending through each circular aperture and diametric aperture to allow the pivoting of the rod between a forward operative position over the seat and a rearward inoperative position rearward of the seat; a fabric sun shield having a forward end secured to the intermediate extent of the rod and having a rearward end secured with respect to the frame between the upper extent and intermediate extent; and locking mechanisms including opposed radial apertures within the enlarged remote ends of the forward support rod with corresponding radial ridges positioned outboardly thereof to secure the rod in either the forward position or the rearward position.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. Its should be appreciated by those skilled in the art that the conception and the disclosed specific embodiment may be readily utilized as a basis for modifying or designing other structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

The same reference numerals refer to the same parts through the various Figures.

DESCRIPTION OF THE PREFERRED EMBODIMENT

Figure 1:
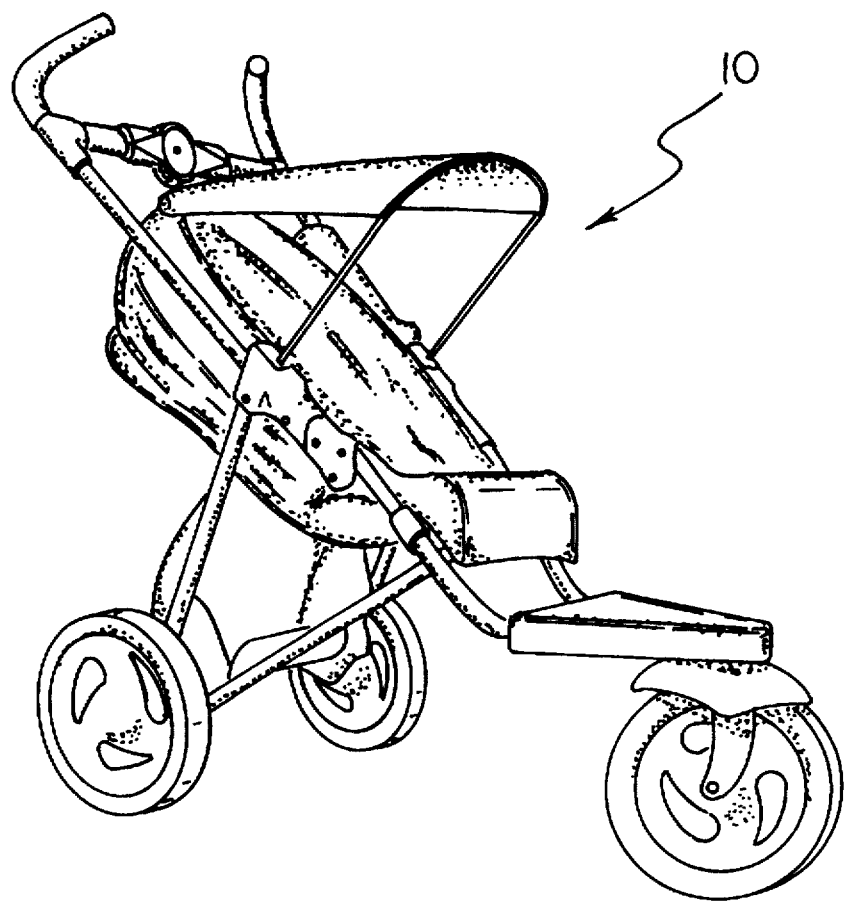
FIG. 1 is a perspective view of the preferred embodiment of the three wheeled stroller constructed in accordance with the principles of the present invention.
Figure 2:
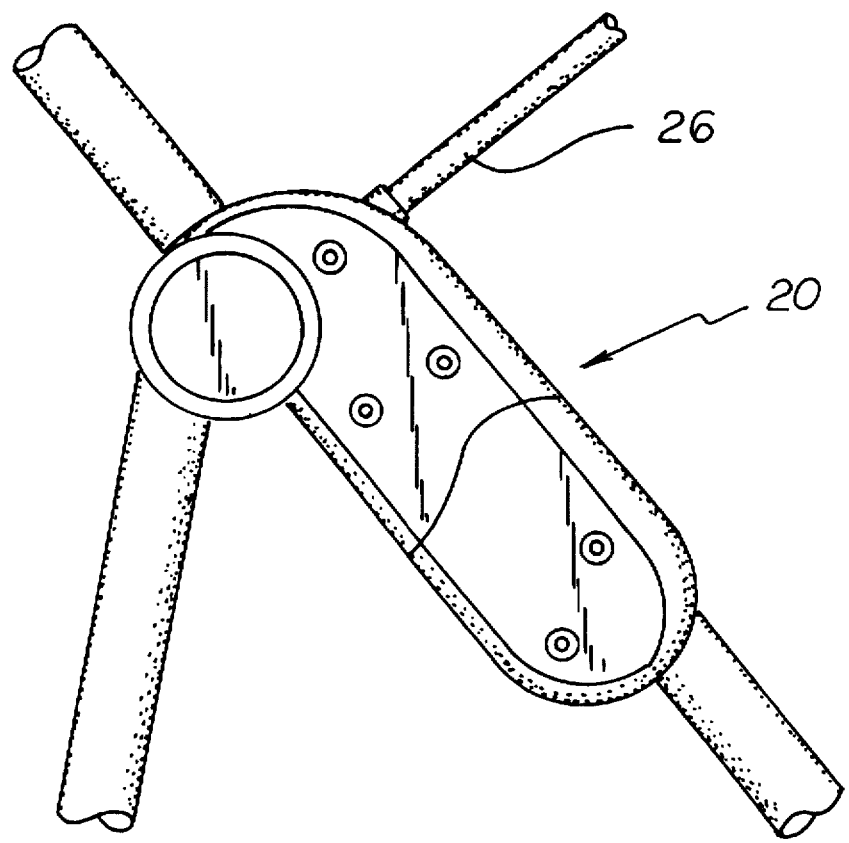
FIG. 2 is an elevational view of a support lock and support rod.
Figure 3:
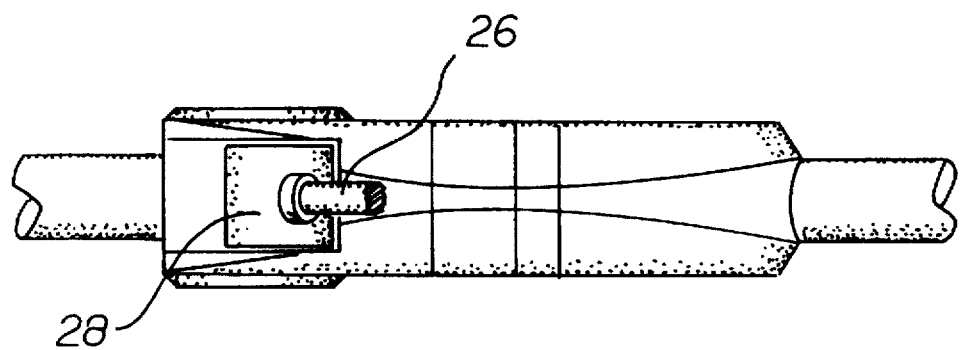
FIG. 3 is a plan view of the support rod/support lock connection depicted in FIG. 2.

The present invention relates to a collapsible three wheeled stroller 10 for use in transporting an infant. In its broadest context, the stroller 10 includes a frame structure to which a seat is adapted to be secured. This frame structure is both laterally collapsible and foldable. Both the collapsing and the folding can be initiated by way of an upper lock assembly positioned adjacent the handles of the frame. The various components of the present invention, and the manner in which they interrelate, will be described in greater detail hereinafter.

The frame structure includes a first and second side frame, each of identical construction. Each side frame includes an upper extent, a lower extent and an intermediate portion therebetween. The upper extent of each side frame takes the form of a curved handle. These handles, as with other components of the frame, can be covered in a resilient foam padding. Each side frame also includes a curved seating frame element adjacent its lower extent. Furthermore, each side frame incorporates a pivot assembly between its upper and lower extents. More specifically, the first side frame includes a first pivot assembly and the second side frame includes a second pivot assembly. Each of the pivot assemblies has a first, engaged, orientation which prevents the pivotal movement between the upper and lower extents of the side frame. Alternatively, each pivot assembly has a second, disengaged, orientation which permits the pivotal movement between the upper and lower extents of the side frame. These pivot assemblies will be described in greater detail hereinafter. In order to facilitate the complete collapsing of the stroller, the two side frames are pivotally interconnected at their lower extents. The manner in which the entire frame structure collapses will be described in greater detail hereinafter.

A first and second side rearward frame constitute two more elements of the overall frame structure. The first side rearward frame has one of its ends interconnected with the intermediate portion of the first side frame. More specifically, this end is secured to the pivot assembly of the first side. This first side rearward frame also has a distal end. In a similar fashion, the second side rearward frame has one of its ends interconnected with the intermediate portion of the second side frame. More specifically, this end is secured to the pivot assembly of the second side. This second side rearward frame also has a distal end.

Lateral stability is provided to the frame structure in three ways: a pair of cross braces; an upper pair of lateral braces; and a lower pair of lateral braces. The upper pair of lateral braces will next be described. The upper pair of lateral braces includes a first upper lateral brace pivotally secured to the upper extent of the first side frame, and a second upper lateral brace pivotally secured to the upper extent of the second side frame. These two lateral braces are pivotally interconnected by way of an upper lateral lock assembly. The details regarding this lateral lock assembly will be described in greater detail hereinafter.

The front wheel assembly of the stroller 10 is interconnected to the lower extents of both the first and second side frames and. In the preferred embodiment, means are included to enable the front wheel to swivel about a vertical axis. Such an arrangement enables the stroller to be easily maneuvered. Additionally, means are included to enable, at the user's discretion, the front wheel to be locked in a desired orientation relative to the vertical axis.

The stroller 10 also employs first and second rear wheel assemblies. More specifically, a first side rear wheel assembly is secured to the distal end of the first rearward frame. In a similar fashion, a second side rear wheel assembly is secured to the distal end of the second rearward frame. To provide additional rigidity, the first side rear wheel assembly is also secured to the distal end of a first cross brace. Likewise, the second side rear wheel assembly is secured to the distal end of a second cross brace. The cross braces and will be described in greater detail hereinafter.

As indicated hereinabove, a pair of lower lateral braces provides a degree of lateral stability to the entire frame structure. The pair includes a first lower lateral brace pivotally secured to the first side rear wheel assemblies, and a second lower lateral brace pivotally secured to the second side rear wheel assemblies. A lower lateral lock assembly serves to pivotally interconnect the first and second lower lateral brace.

As indicated hereinabove, a pair of cross braces provide another degree of lateral rigidity to the frame structure. The pair includes a first cross brace having an end interconnected to the lower extent of the second side frame and a distal end connected to the first rear wheel assembly. Likewise, a second cross brace has an end interconnected the lower extent of the first side frame and a distal end connected to the second rear wheel assembly. For each side, a clevis is employed in interconnecting the cross brace to the lower extent of the side frame. Specifically, a first clevis is employed in interconnecting the first cross brace to the lower extent of the second side frame; and a second clevis is employed in interconnecting the second cross brace to the lower extent of the first cross brace. Each clevis permits it corresponding cross brace to both pivot and rotate relative to the lower extent of the side frame.

Turning now to the lateral lock assemblies, the upper lateral lock assembly includes a first hinge component and a second hinge component pivotally disposed between the first and second upper lateral braces. The lateral lock assemblies, per se, are generally described in co-pending application Ser. No. 08/736743, attorney docket number P-4741, entitled Collapsible Three Wheel Stroller With Improved Hinge, filed concurrently herewith, the subject matter of which is incorporated herein by reference.

The lower lateral lock assembly includes a collar which is employed in bringing the lower lateral lock assembly into its disengaged orientation. The disengaged orientation of the lower lateral lock assembly permits the relative pivotal movement of the lower lateral braces.

The first and second pivot assemblies will next be described. The two pivot assemblies are identical in construction, consequently, only one such assembly will be described in detail. The side frame intermediate pivot assembly includes a housing component and a receptacle component. Additionally, a plunger is slidably positioned within the housing component. This plunger is spring biased such as to normally extend into the receptacle component and thereby prevent the pivotal movement between the upper and lower extents of the side frame. Thus, the pivot assemblies have a first, engaged, orientation wherein the plunger is positioned within the receptacle component; and a second, disengaged, orientation wherein the plunger is removed from the housing component.

The pivot assemblies are only in their disengaged orientations after the upper pair of lateral braces have pivoted relative to one another. Thus, the pivoting of the upper and lower extents of the side frames occurs only after upper lateral lock assembly permits the pivoting of the upper pair of lateral braces. This arrangement is achieved via first and second plunger linkages. Although linkage is described in accordance with the present invention other structures would suffice such as a semi rigid cord or a thin wire. A first plunger linkage serves to interconnect the first upper lateral brace and the plunger of the first side intermediate pivot assembly. This first plunger linkage functions such that pivotal movement of the first upper lateral brace brings the first pivot assembly into its disengaged orientation. Thus, pivotal movement between the upper and lower extents of the first side frame is permitted.

In a similar fashion, a second plunger linkage interconnects the second upper lateral brace and the plunger of the second side intermediate pivot assembly. This second plunger linkage functions such that pivotal movement of the second upper lateral brace brings the second pivot assembly into its disengaged orientation. Thus, pivotal movement between the upper and lower extents of the second side frame is permitted.

Therefore, the operating orientation of the frame is achieved when the upper lateral, lower lateral, and two side pivot assemblies are in their engaged orientations. When a user wishes to collapse the stroller the following steps must be taken. First, bring the upper lateral lock assembly into its disengaged orientation. Next, the upper lateral lock assembly is pushed inwardly to effect the pivoting of the two upper lateral braces with respect to the first and second side frames. The collar of the lower lateral lock assembly must also be disengaged to bring the lower lateral lock into its disengaged orientation. As the upper lateral braces are pivoted the upper lateral lock moves downwardly. Also, as the lower lateral braces are pivoted the lower lateral lock moves upwardly. The pivotal motion of the upper lateral braces provides tension within the length of the two plunger linkages. This tension within the plunger linkages brings the two pivot assemblies into their disengaged states. Next, the upper extents of the side frames are pivoted toward the lower extents of the side frames. The stroller is now in its collapsed configuration.

The collapsible and foldable frame does not in anyway interfere with the seating material that is adapted to be positioned upon the frame. The seating material has its two sides removably secured to the two side frames of the frame structure. Furthermore, the lower extent of the seating material is removably secured over each curved seating frame element. The seating portion of the stroller is created by positioning of the seating material over these curved seating frame elements.

The present invention further includes a new and improved canopy assembly for selectively providing shade to an infant seated within the stroller. In its broadest context, the canopy includes a rod having its two ends rotatably secured to the pivot assemblies of the frame structure. Furthermore, a fabric sunshield extends between the support rod and the upper frame portion of the stroller. Thus, the forward support rod can be pivoted to a forward orientation wherein the sunshield is in an opened configuration, or the support rod can be retracted thereby collapsing the sunshield rearwardly of the stroller seat. The various components of this canopy assembly, and the manner in which they interrelate will be described in greater detail hereinafter.

As described hereinabove, the stroller 10 of the present invention includes a frame assembly having a lower component, an upper component and an intermediate component therebetween. Furthermore, a plurality of wheels, each rotatable about a horizontal axis, are coupled with respect to the lower component of the stroller. In order to enable a user to maneuver the stroller, a pair of handles are secured with respect to the upper component of the frame. The stroller is adapted to support a child by way of a fabric seat which is coupled with respect to the frame adjacent the intermediate extent thereof. Also as detailed hereinabove, a fixed support lock is secured to the frame adjacent each intermediate component.

Figure 4:
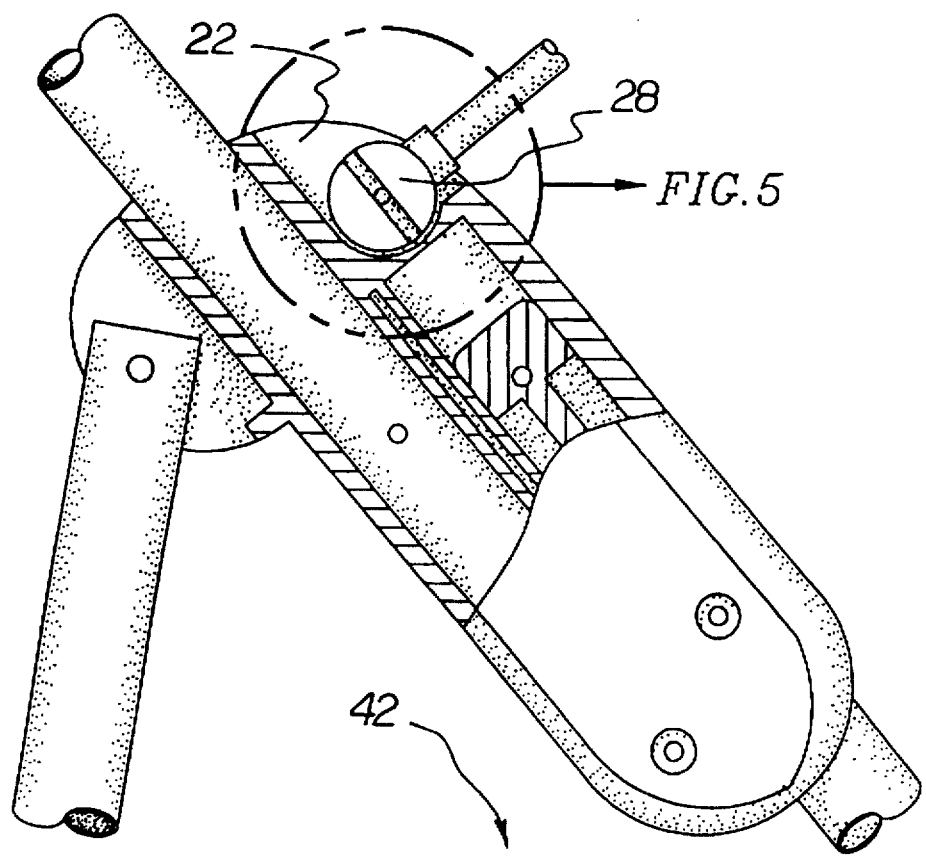
FIG. 4 is a partial sectional view of the support rod/support lock connection depicted in FIG. 2.
Figure 5:
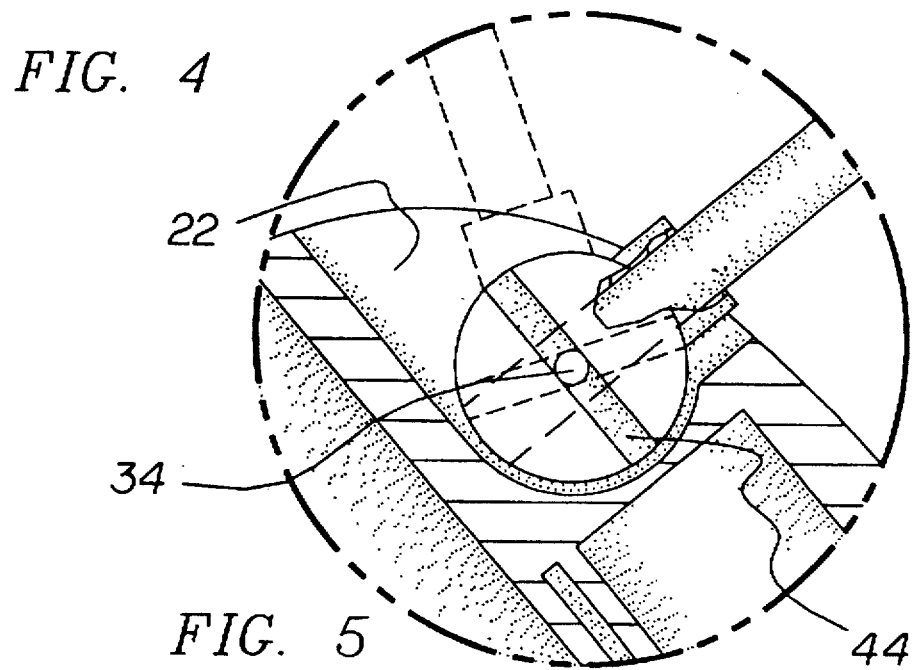
FIG. 5 is a detailed view of FIG. 4.

The canopy assembly 12 is interconnected to the stroller frame by way of the fixed support locks 20. More specifically, each support lock 20 has an enlarged recess 22 formed adjacent to its upper extent. One such enlarged recess 22 can be seen with reference to FIGS. 4 and 5. With continuing reference to FIGS. 4 and 5, each of these enlarged recesses 22 includes a circular aperture 24 extending therethrough. These circular apertures 24 serve to support a support rod 26 in a manner which will be described hereinafter.

Figure 6:
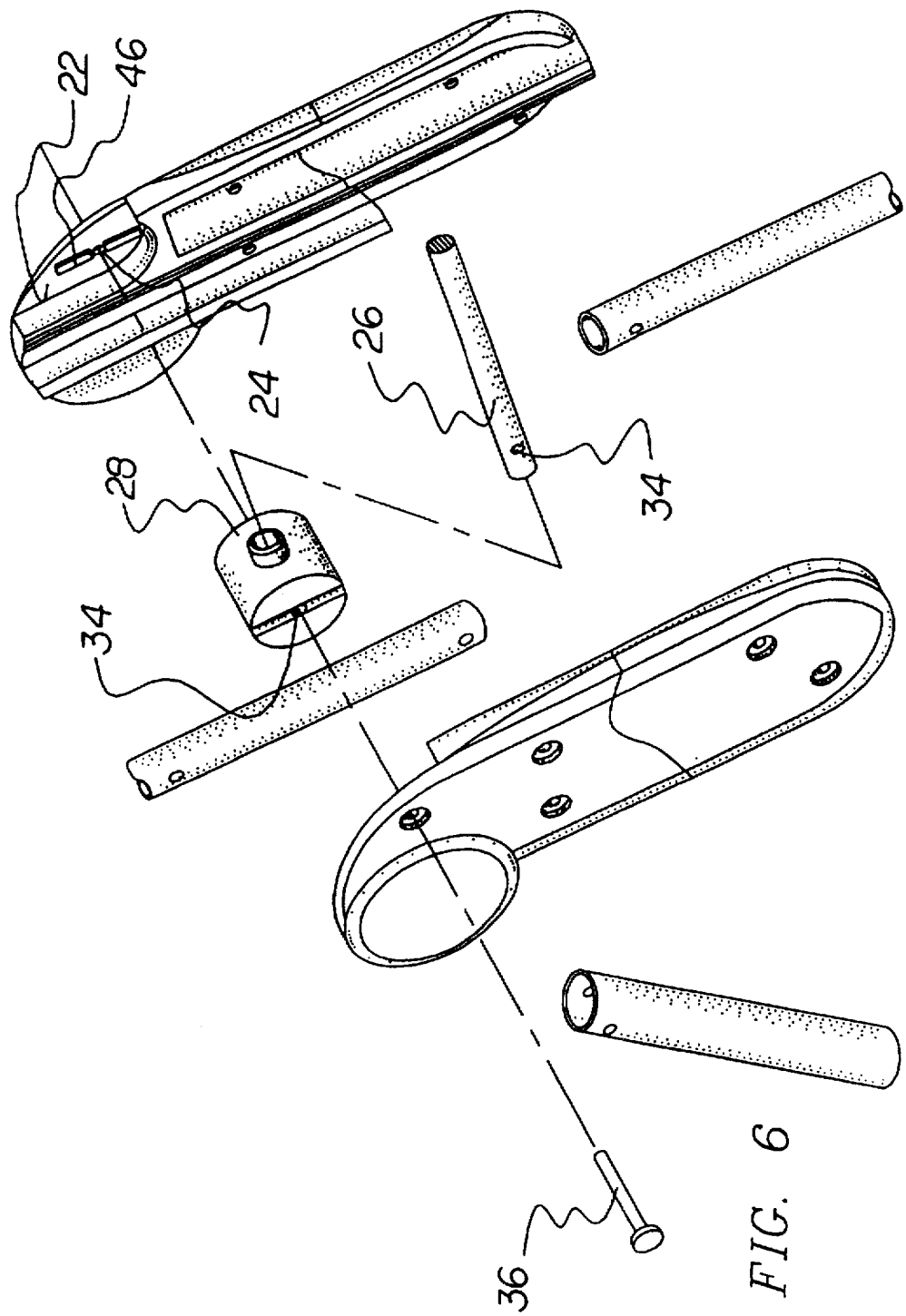
FIG. 6 is an exploded view of the support rod/support lock connection of the present invention.

The forward support rod 26 forms the main support for the canopy assembly 12. In the preferred embodiment, the support rod is fabricated of a resilient material. Additionally, the support rod 26 includes enlarged remote ends 28 and an intermediate extent which extends between the remote ends. One such remote end can be seen in reference to FIG. 6. Furthermore, a diametric aperture 34 extends through the enlarged remote end as well as the corresponding end of the support rod 26. Each diametric aperture 34 serves to pivotally couple the support rod 26 to the remainder of the support frame. Each of the enlarged remote ends 28 is positionable adjacent a support lock 20 such that the diametric aperture 34 of the enlarged remote end is positioned in axial alignment with the associated circular aperture 24 of the support lock 20. A cylindrical pin 36 extends through both the circular aperture 24 and the diametric aperture 34 to allow for the pivoting of the support rod 26 between a forward operative position over the seat and a rearward inoperative position rearward of the seat. The relationship between one such support lock 20 and enlarged remote end 28 can be seen in reference to FIG. 6. Only one support rod 26/support lock 20 connection has been described, however, the two connections are of identical construction.

The fabric sunshield 38 has a forward end which is secured to the intermediate extent 32 of the support rod 26. Furthermore, the sunshield 38 has a rearward end which is secured with respect to the frame between the upper and intermediate extent. The sunshield can be secured to the rod and/or frame component by way of a cylindrical aperture formed within the sunshield by way of stitching.

The sunshield 38 is secured in its forward and rearward positions by way of a locking mechanism 42. The locking mechanism includes two opposed radial apertures formed within each of the enlarged remote ends of the forward support rod. One such radial aperture 44 can be seen in reference to FIG. 5. Additionally, each support lock 20 incorporates a pair of ridges 46 formed adjacent to both the inboard and outboard ends of either enlarged ends 28. Through this construction, either of the enlarged ends 28 becomes fixed in relation to its corresponding support lock 20 in either the operative or inoperative position. More specifically, the inboard and outboard radial apertures 44 of each enlarged end 28 engages the corresponding ridges 46 of the support lock 20 when the support rod 26 is either in the operative or inoperative position.

As to the manner of usage and operation of the present invention, the same should be apparent from the above description. Accordingly, no further discussion relating to the manner of usage and operation will be provided. Note, however, that the stroller per se is generally described in co-pending application Ser. No. 07/736743, attorney docket number P-4741, entitled Collapsible Three Wheeled Stroller, filed concurrently herewith, the subject matter of which is incorporated herein by reference.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. A canopy assembly for a stroller with simplified mechanisms to facilitate assembly and use comprising:

a stroller having a frame assembly with a lower component, an upper component and an intermediate component therebetween;

a plurality of wheels rotatable about horizontal axes coupled with respect to the lower component;

a pair of handles secured with respect to the frame adjacent to the upper component thereof and a seat coupled with respect to the frame adjacent the intermediate extent thereof;

fixed support locks secured to the frame adjacent to the intermediate component, each lock having an enlarged recess adjacent to the upper extents thereof with a circular aperture extending therethrough;

a forward support rod fabricated of a resilient material of an extended length with enlarged remote ends and an intermediate extent therebetween, the enlarged remote ends having diametric apertures extending therethrough, each diametric aperture positionable in axial alignment with an associated circular aperture in the support lock with a cylindrical pin extending through each circular aperture and diametric aperture to allow the pivoting of the rod between a forward operative position over the seat and a rearward inoperative position rearward of the seat;

a fabric sun shield having a forward end secured to the intermediate extent of the rod and having a rearward end secured with respect to the frame between the upper extent and intermediate extent; and locking mechanisms including opposed radial apertures within the enlarged remote ends of the forward support rod with corresponding radial ridges positioned outboardly thereof to secure the rod in either the forward position or the rearward position.

2. A canopy assembly for a stroller with simplified mechanisms to facilitate assembly and use comprising:

a stroller having a frame assembly with a lower component, an upper component and an intermediate component therebetween;

a plurality of wheels rotatable about horizontal axes coupled with respect to the lower component;

a pair of handles secured with respect to the frame adjacent to the upper component thereof and a seat coupled with respect to the frame adjacent the intermediate extent thereof;

fixed support locks secured to the frame adjacent to the intermediate component, each lock having an enlarged recess adjacent to the upper extents thereof with a circular aperture extending therethrough; and a forward support rod of an extended length with enlarged remote ends and an intermediate extent therebetween, the enlarged remote ends having diametric apertures extending therethrough, each diametric aperture positionable in axial alignment with an associated circular aperture in the support lock with a cylindrical pin extending through each circular aperture and diametric aperture to allow the pivoting of the rod between a forward operative position over the seat and a rearward inoperative position rearward of the seat.

3. A canopy assembly as described in claim 2 and further comprising a fabric sun shield having a forward end secured to the intermediate extent of the rod and having a rearward end secured with respect to the frame between the upper extent and intermediate extent.

4. A canopy assembly as described in claim 2 and further comprising locking mechanisms including opposed radial apertures within the enlarged remote ends of the forward support rod with corresponding radial ridges positioned outboardly thereof to secure the rod in either the forward position or the rearward position.

5. A new and improved canopy assembly as described in claim 2 wherein the support rod is fabricated from a resilient material.

* * * * *